Oct. 2, 1923.
A. O. LILE
COUPLING
Filed May 24, 1920
1,469,671
2 Sheets-Sheet 1
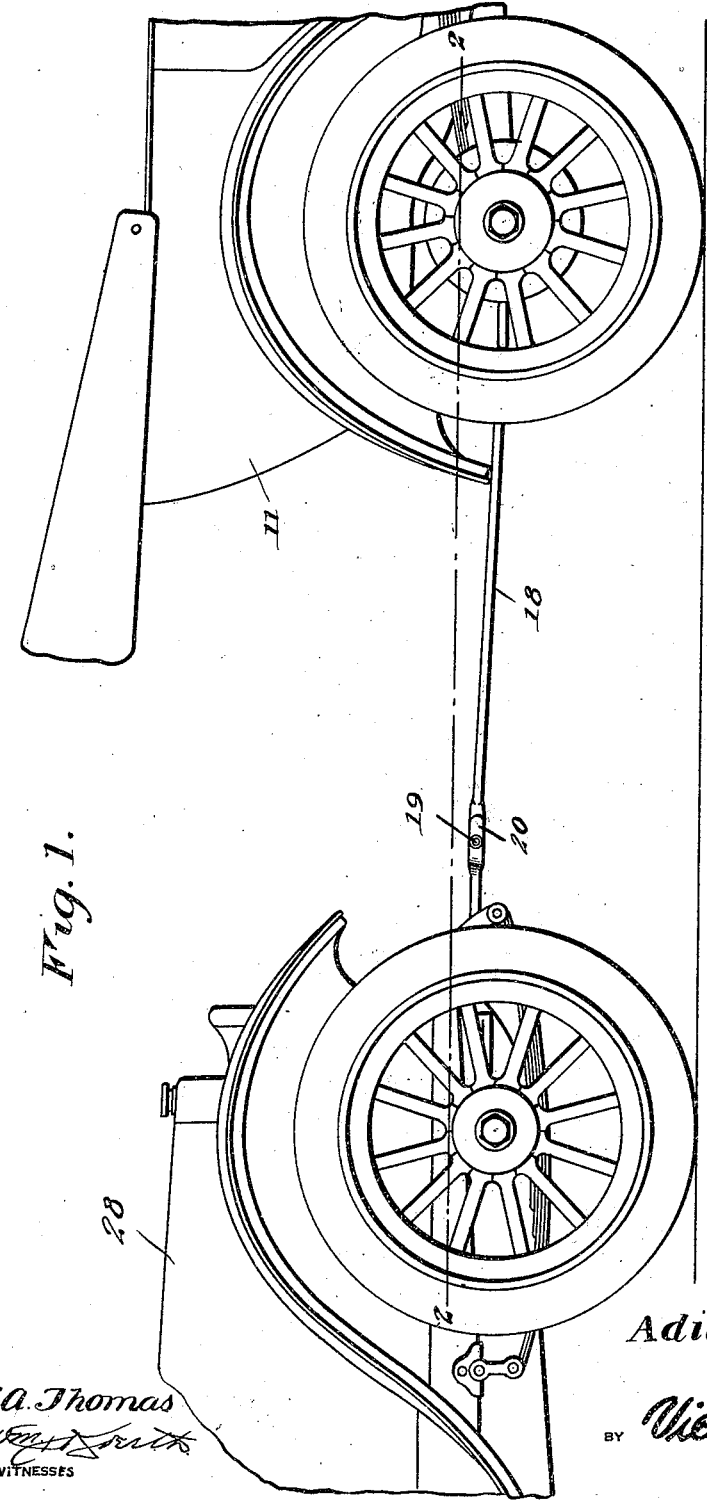
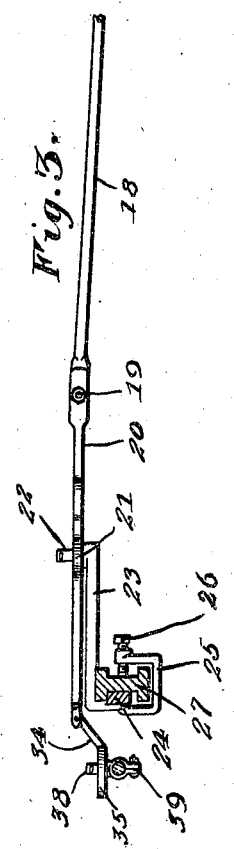
Adiel O. Lile.
INVENTOR
BY Victor J. Evans
ATTORNEY

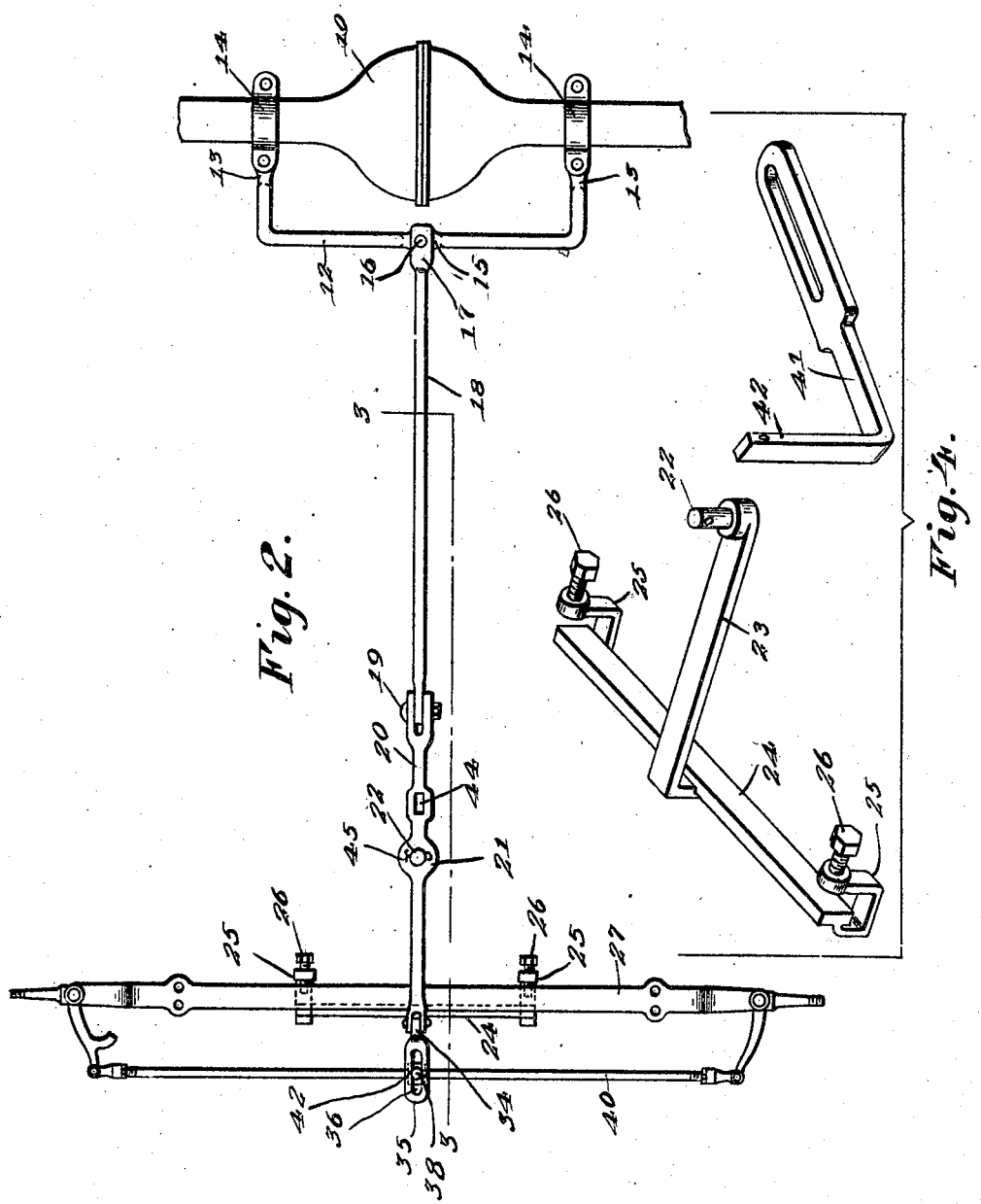

Patented Oct. 2, 1923.

1,469,671

UNITED STATES PATENT OFFICE.

ADIEL O. LILE, OF CORBIN, KANSAS.

COUPLING.

Application filed May 24, 1920. Serial No. 383,861.

*To all whom it may concern:*

Be it known that I, ADIEL O. LILE, a citizen of the United States, residing at Corbin, in the county of Sumner and State of Kansas, have invented new and useful Improvements in Couplings, of which the following is a specification.

The present invention has reference to means for hitching a trailer or a disabled automobile to another automobile whereby the first mentioned vehicle may be propelled by the last mentioned vehicle, and the object of the invention is to produce a construction which may be easily and quickly attached to both of the vehicles and which will automatically cause the steering of the drawn vehicle to cause the same to travel in the same direction as the pulling vehicle.

The foregoing objects, and others which will appear as the nature of the invention is better understood, may be accomplished by a construction, combination and operative arrangement of parts such as is disclosed by the drawings.

In the drawings:—

Figure 1 is a side elevation illustrating an automobile having a trailer, or disabled car attached thereto in accordance with this invention.

Figure 2 is a plan view of the improvement, being in section and approximately on the line 2—2 of Figure 1.

Figure 3 is a sectional view approximately on the line 3—3 of Figure 2.

Figure 4 illustrates details of the invention.

To the rear axle housing 10 of an automobile 11 I secure a yoke 12. The parallel arms of the yoke 12 are integrally formed with U-shaped depressed portions 13 forming half bearings, and these bearings are disposed on the axle housing 10 to the opposite sides of the differential. The removable bearing sections are indicated by the numeral 14, the same having central U-shaped parts and angle arms, the latter being connected by bolts or the like to the side members or arms of the yoke.

The outer and connecting member for the arms of the yoke is centrally formed with a lug 15. To this lug is removably connected by a pivot 16 the bifurcated end 17 of a link 18. The link has its outer end pivotally connected, as at 19 to a bar 20. This bar, approximately at the center thereof is formed with an enlargement 21 and through the center of the said enlargement is an opening. Through this opening is designed to be received the offset end or trunnion 22 of a rod member 23. The rod, at the outer end thereof has a lateral extension 24 which, adjacent to its ends is provided with C-shaped clamps 25. The outer ends of the clamps 25 have threaded openings and the threads of the said openings are engaged by adjustable binding members such as bolts 26. The clamps 25 are arranged over the front axle 27 of the trailer or disabled vehicle 28, and the bolts are adjusted to properly secure the clamps 25 on the said axle 27.

The numeral 34 designates an angle member that is pivotally connected to the end of the arm 20. The horizontal element of the angle member 34 indicated for distinction by the numeral 35 has an elongated slot 36 formed therein through which passes the stem 38 of a clip 39. This clip member surrounds and is secured to the front steering rod 40 of the vehicle 28 when the said steering rod is arranged to the rear of the front axle. In event of the steering rod being disposed outward of the front axle the stem 38 is engaged by an elongated slot in an angle member 41 that has the vertical arm thereof passing through a slot 44 in the bar 20 between the link and enlargement 21 of the said bar. The vertical arm of the angle member 41 is provided with a transverse opening adjacent to the upper end thereof which is adapted to receive a cotter pin or the like to retain the member in adjusted position. The stem of the clip has an opening through which the stem is adapted to receive a cotter pin that sustains the said clip on the device. The short shaft or trunnions 22 of the rod 23 also has an opening therethrough, and through this opening also passes a cotter pin 45 which holds the rod removably pivoted to the bar.

The clip 39 is also permitted a limited longitudinal movement on the arm by virtue of the stem thereof passing through the elongated slot 36 in the end of the arm. This permits of the proper engagement of the clips with the steering rod should the same not be positioned a determined distance from the axle 27. In addition to this the arm is permitted a comparatively free movement in a vertical direction, but such movement is restricted by contact of the arm with the cotter pin in the stem of the clip. The finger 32 holds the arm against swinging movement laterally of the bar. The hinged or pivoted connection between the rod 23 and the bar permits of the clips on the said rod being properly secured to the axle, and the loose connection between all of the parts compensates for the vibration to which the vehicle 28 will be subjected so that the connected parts of the improvement cannot thus be broken.

It is thought from the foregoing description, when taken in connection with the drawings that the simplicity and advantages thereof will be apparent to those skilled in the art to which such inventions appertain without further detail description.

Having thus described the invention, what I claim is:—

A towing device of the character described comprising a yoke designed to be secured to the rear axle housing of a towing vehicle, a link having a bifurcated end pivotally secured intermediate the ends of the yoke, a bar pivotally secured to the opposite end of the link and being provided with an enlarged portion formed intermediate its ends, said enlarged portion having an opening and being arranged adjacent a slot formed in the link, a slotted member having an angled end pivotally secured to the opposite end of the arm, a clip secured to the steering rod of the towed vehicle, a stem rising from the clip and being adapted to be slidably mounted in the slot in the slotted member, a rod member, a trunnion rising from one end of the member and being received in the opening of an enlarged portion, an extension formed on the opposite arm of the rod member, C-shaped clamps carried by each end of the extension and being adapted to be secured to the front axle of the towed vehicle and an angled member adapted to be detachably secured in the slot of the bar as and for the purpose specified.

In testimony whereof I affix my signature.

ADIEL O. LILE.